J. H. WALKER.
BOLL WEEVIL CATCHER.
APPLICATION FILED SEPT. 2, 1919.
1,363,026.
Patented Dec. 21, 1920.
2 SHEETS—SHEET 1.
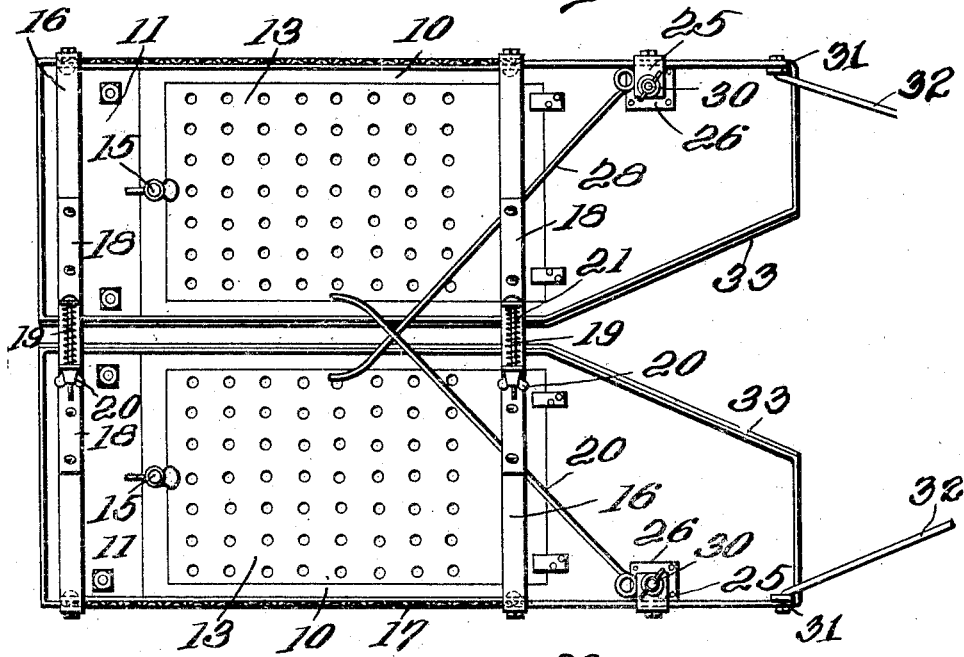
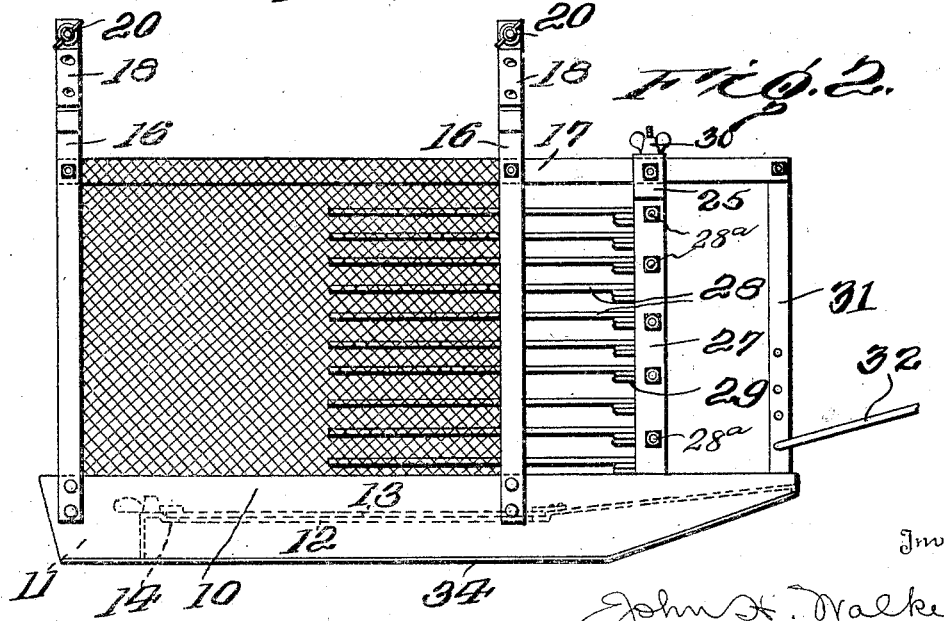

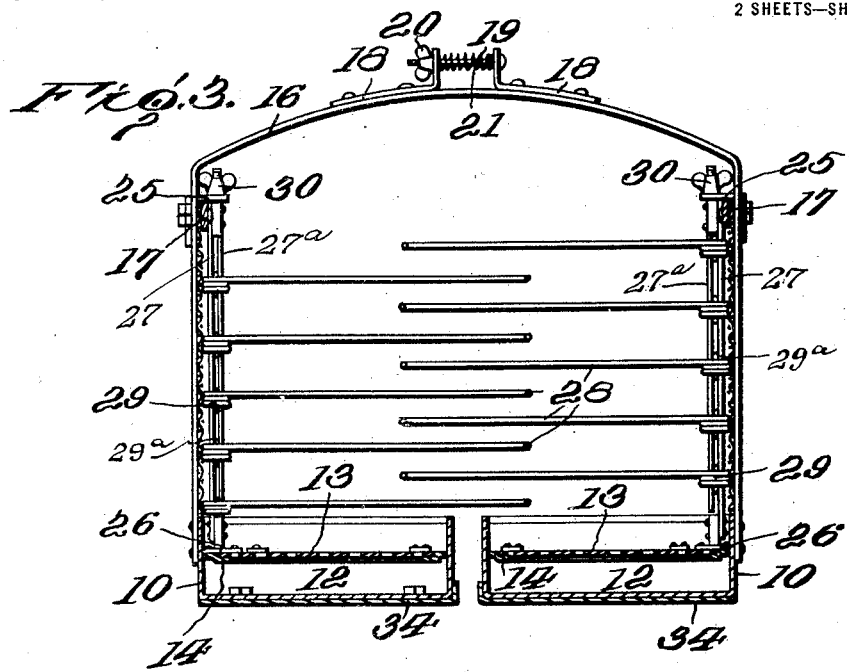
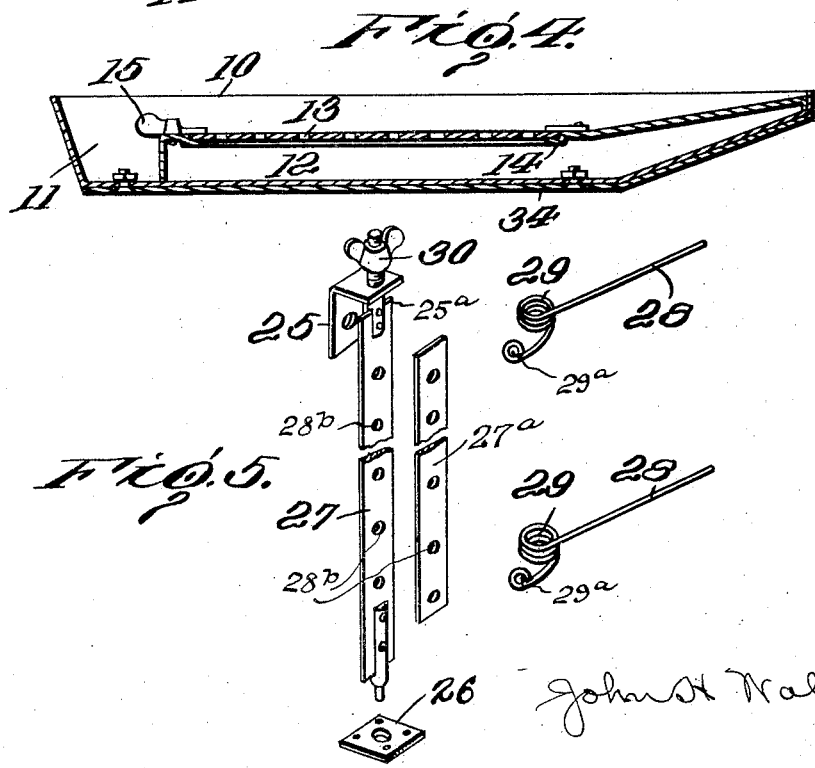

UNITED STATES PATENT OFFICE.

JOHN H. WALKER, OF RHINE, GEORGIA.

BOLL-WEEVIL CATCHER.

1,363,026.  Specification of Letters Patent.  Patented Dec. 21, 1920.

Application filed September 2, 1919. Serial No. 321,244.

*To all whom it may concern:*

Be it known that I, JOHN H. WALKER, a citizen of the United States, residing at Rhine, in the county of Dodge and State of Georgia, have invented a new and useful Boll-Weevil Catcher, of which the following is a specification.

This invention is a device for removing boll weevils from cotton plants and holding them entrapped until they may be destroyed.

One of the objects of the invention is to provide a device of simple and light construction which may be drawn along the drills, and having means for agitating the cotton plants to a sufficient extent to beat down the weevils and injured bolls into suitably constructed receptacles. A further object is to provide means whereby the device may be adjusted to conform to variations in the drills.

The invention will be hereinafter fully set forth and particularly pointed out in the claims.

In the accompanying drawing:—

Figure 1 is a plan view illustrating a device constructed in accordance with the invention. Fig. 2 is a side elevation thereof. Fig. 3 is a transverse sectional view looking forwardly. Fig. 4 is a longitudinal sectional view illustrating one of the receptacles. Fig. 5 is a perspective view illustrating the means for adjusting the beaters.

Referring to the drawing, 10, 10, designate two spaced apart sled-like receptacles shaped to rest upon and to be drawn over the ground along the drills. The receptacles are provided with pockets 11 and with trapping chambers 12, the latter having openings in their tops normally covered by perforated plates 13 resting upon suitable flanges 14, and normally held in locked position by suitable locking devices such as the buttons 15.

The receptacles 10 are maintained in spaced relation by metallic bows 16, possessing more or less elasticity and secured in suitable manner to the receptacles. Said bows are connected by brace bars 17. Secured to the respective bows near the middle portions thereof, are spaced apart strips 18, each having an upstanding portion through which is passed a bolt 19, one bolt for each pair of strips, said bolt being provided with a nut 20 by means of which the upstanding portions of each pair of strips may be moved toward each other against the tension of a spring 21 surrounding the bolt and acting normally to separate said upstanding portions. By screwing up the nut to compress the spring the receptacles 10 are caused to separate more or less according to the degree of adjustment of the nut, and by unscrewing the nut the spring causes the upstanding portions of the strips 18 to separate and thereby bring the receptacles closer together. In this way the relative positions of the receptacles may be varied to conform to different widths of drills.

Attached to the ends of brace bars 17 are ears 25, which coöperate with sockets 26 to rotatably support carrier bars 27 which carry stripper members 28 extending diagonally across the receptacles in a generally rearward direction and of such a length that the stripper members on one side will cross the corresponding members on the other side. The bars 27 and 27$^a$ are provided with bolt holes 28$^b$ through which are passed the bolts 28$^a$. Said bolts are also passed through the eyes 29$^a$ of the stripper members 28, which eyes are located between and clamped by the bars 27 and 27$^a$, clamping pressure being applied by suitable nuts engaging the bolts in a well-known manner, as shown. In order that the stripper members may possess more or less resilience they are preferably provided near their points of support with coiled portions 29 forming helical spring-like members. The carrier bars 27 are provided with shoulders 25$^a$ and reduced threaded stems, the lattter extending through suitable openings in the ears 25, and said bars are held against rotation by means of the nuts 30 working on said threaded stems, said nuts acting to bind the shoulders 25$^a$ against the surfaces of the contiguous ears 25, in a manner which will be clearly understood from the drawing. The tension on the beaters or strippers 28 may be varied by loosening nuts 30 and rotating the bars 27 to a new angular position in which they may be retained by again tightening the nuts.

The device may be drawn along the drills by any suitable means such as a handle having draft rods 32 adjustably connected to uprights 31 secured to the respective receptacles. The inner side of the forward portion of each receptacle is inclined as indicated at 33 to provide a flaring guide for directing the cotton stalks in between the receptacles. The receptacles 10 are also provided with removable wear plates 34.

In operation the device is drawn along the drills in such a manner that the cotton stalks are caused to pass between the receptacles, and as the device travels the stripper members 26 beat against the plants and agitate them to such an extent that the weevils are beaten down into the receptacles together with any loose punctured bolls that might be on the cotton. It will be observed that the trapping chambers 12 are near the forward ends of the receptacles and are so positioned that as the weevils fall they will drop through the perforated plates 13 into said chambers 12, where they will be entrapped because they cannot fly through the perforations and the flanges around the openings of said chambers will prevent them from climbing out. As the device travels the squares are brushed backward by the under-hanging leaves of the cotton stalks into the pockets 12. By passing the device over the cotton a few times at about the season when the bolls first form the plants may be absolutely freed from weevils because the stripper members 26 are so constructed that they will engage and shake every leaf and every part of the plant.

Having thus explained the nature of the invention, and described an operative manner of constructing and using the same, although without attempting to set forth all of the forms of its use or all of the forms in which it may be made, what is claimed is:—

1. A boll weevil catcher comprising two spaced apart receptacles each having an entrapping chamber, elastic members connecting the two receptacles and maintaining them in parallel relation, means acting on said elastic members to vary the distance between said receptacles, stripping devices supported above said receptacles, and perforated covers for said entrapping chambers.

2. A boll weevil catcher comprising two spaced apart receptacles each having an entrapping chamber, elastic members connecting the two receptacles and maintaining them in parallel relation, means for controlling the tension on said elastic members, whereby the distance between said receptacles may be varied, stripping devices supported above said receptacles, and perforated covers for said entrapping chambers.

3. A boll weevil catcher comprising two spaced apart receptacles, each having an entrapping chamber, removable perforated covers for said chambers, elastic bows connecting both of said receptacles and maintaining them in parallel relation, stripping devices supported above said receptacles, and means coöperating with said bows for adjusting the distance between the receptacles.

4. A boll weevil catcher comprising two spaced apart receptacles, each having an entrapping chamber, bows connecting said receptacles and maintaining them in parallel relation, each bow being provided with spaced apart upstanding members arranged in pairs, bolts passed through the pairs of upstanding members, nuts coöperating with the bolts, and springs surrounding the bolts and acting to normally separate the upstanding members of each pair, and stripping devices supported above said receptacles.

5. A boll weevil catcher comprising two spaced apart receptacles, each having an entrapping chamber, means for maintaining said receptacles in spaced relation, supporting means carried by the respective receptacles, vertically disposed carrier bars mounted in said supporting means, and stripper members secured to said carrier bars and positioned to extend transversely across the receptacles.

6. A boll weevil catcher comprising two spaced apart receptacles, each having an entrapping chamber, means for maintaining the receptacles in parallel relation, carrier bars supported by the respective receptacles, and rotatably adjustable, resilient stripper members secured to said carrier bars and extended transversely across the receptacles, and means coöperating with the carrier bars to hold them normally stationary.

7. A boll weevil catcher comprising two spaced apart receptacles, each having an entrapping chamber, means for maintaining the receptacles in parallel relation, carrier bars, stripper members secured to said carrier bars and positioned to extend transversely across the receptacles, means supported by the receptacles for rotatably supporting the carrier bars, whereby the angle of projection of the stripper members may be varied, and means normally preventing rotation of said carrier bars.

8. A boll weevil catcher comprising two spaced apart receptacles each having an entrapping chamber, means for maintaining the receptacles in parallel relation, carrier bars, stripper members having coiled portions to provide resilience, means for securing said stripper bars to said carrier bars in position to extend transversely across the receptacles, means supported by the receptacles for rotatably supporting the carrier bars, whereby the angle of projection of the stripper members may be varied, and means normally preventing rotation of said carrier bars.

9. A boll weevil catcher comprising spaced apart entrapping receptacles, means for maintaining said receptacles in parallel relation, brackets secured to said receptacles, carrier bars rotatably engaging said brackets, stripping devices attached to said carrier bars above said receptacles, and binding screws coöperating with said carrier bars and brackets for normally preventing rotative movement of said carrier bars.

In testimony whereof I have hereunto set my hand.

JOHN H. WALKER.